US011962089B2

United States Patent
Rausch et al.

(10) Patent No.: US 11,962,089 B2
(45) Date of Patent: Apr. 16, 2024

(54) LUNEBURG LENS SIGNAL REPEATER

(71) Applicant: T-Mobile Innovations LLC, Overland Park, KS (US)

(72) Inventors: Walter F. Rausch, Olathe, KS (US); Bharatwajan Raman, Arlington, VA (US); Oliver Philippe Coudert, Arlington, VA (US); Pei Hou, Centreville, VA (US); Durga Prasad Satapathy, Ashburn, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 10 days.

(21) Appl. No.: 17/566,105

(22) Filed: Dec. 30, 2021

(65) Prior Publication Data

US 2023/0216207 A1 Jul. 6, 2023

(51) Int. Cl.
*H01Q 3/46* (2006.01)
*H01Q 15/08* (2006.01)
*H01Q 19/06* (2006.01)
*H01Q 19/09* (2006.01)

(52) U.S. Cl.
CPC ........... *H01Q 15/08* (2013.01); *H01Q 19/062* (2013.01); *H01Q 19/09* (2013.01)

(58) Field of Classification Search
CPC ...... H01Q 15/08; H01Q 15/02; H01Q 19/062; H01Q 19/09; H01Q 19/06; H01Q 1/525; H01Q 3/46
See application file for complete search history.

(56) References Cited

U.S. PATENT DOCUMENTS

| 11,081,796 B2* | 8/2021 | Ashrafi | H01Q 21/065 |
| 2003/0006941 A1* | 1/2003 | Ebling | H01Q 25/008 343/911 L |
| 2006/0028386 A1* | 2/2006 | Ebling | H01Q 13/24 343/753 |
| 2017/0062944 A1* | 3/2017 | Zimmerman | H01Q 21/061 |
| 2021/0111496 A1* | 4/2021 | Matitsine | H01Q 19/06 |

* cited by examiner

*Primary Examiner* — Awat M Salih
(74) *Attorney, Agent, or Firm* — Shook, Hardy & Bacon L.L.P.

(57) ABSTRACT

Systems, methods, and computer-readable media are described herein which utilizes and controls an electromagnetic energy beam steering apparatus. The electromagnetic energy beam steering apparatus uses directional properties of a Luneburg lens to receive RF energy from one or more points of the Luneburg lens and re-transmits the RF energy from a different point of the Luneburg lens to focus the RF energy in a desired direction. The electromagnetic energy beam steering apparatus may take a form of a passive repeater, an active repeater, or a multipath active repeater.

13 Claims, 7 Drawing Sheets

LUNEBURG LENS SIGNAL REPEATER

SUMMARY

A high-level overview of various aspects of the present disclosure is provided here to introduce a selection of concepts further described in the detailed description. This summary is neither intended to identify key features or essential features of the claimed subject matter, nor intended to be used as an aid in isolation to determine the scope of the claimed subject matter.

In brief and at a high level, the present disclosure describes, among other things, systems, methods, and computer-readable media that employ a Luneburg lens repeater which utilizes a Luneburg lens and antennas to receive an incoming signal and transmit that signal in a direction different from the incoming signal through the Luneburg lens. For example, an incoming collimated signal is focused through a Luneburg lens onto a first antenna. The first antenna then transmits the incoming collimated signal to a second antenna through a transmission line which then broadcasts an un-collimated signal through the Luneburg lens which then collimates it.

BRIEF DESCRIPTION OF THE DRAWINGS

Illustrative embodiments of the present disclosure are described in detail below with reference to the attached drawing, wherein.

DETAILED DESCRIPTION

The subject matter of select embodiments of the present disclosure are described with specificity herein to meet statutory requirements. The detailed description is not intended to define what is regarded as the invention nor intended to limit the scope of the claimed subject matter. The claimed subject matter might be embodied in other ways to include different steps or combinations of steps similar to those described herein, in conjunction with other present or future technologies. Terms recited herein should not be interpreted to imply any particular order among or between various steps described herein unless and except when an order of individual steps is explicitly described.

Throughout the description of the present disclosure, several acronyms and shorthand notations are used to aid the understanding of certain concepts pertaining to an associated system and services. These acronyms and shorthand notations are solely intended for the purpose of providing an easy methodology of communicating the ideas expressed herein and are in no way meant to limit the scope of the present disclosure. Further, various technical terms are used throughout the detailed description. Definitions of such terms can be found in, for example, Newton's Telecom Dictionary by H. Newton, 31st Edition (2018). These definitions are intended to provide a clear understanding of the ideas disclosed herein but are not intended to limit the scope of the present disclosure. The definitions and terms should be interpreted broadly and liberally to the extent allowed by the meaning of the words offered in the above-cited reference.

Embodiments of the technology may be implemented as, among other things, a method, system, or a computer-program product. Accordingly, the embodiments may include a hardware embodiment, or an embodiment combining software and hardware. In one embodiment, the present disclosure takes the form of a computer-program product that includes computer-useable instructions embodied on one or more computer-readable media.

The computer-readable media includes volatile and/or nonvolatile media, removable and non-removable media, and contemplates media readable by a database, a switch, and various other network devices. Network switches, routers, and related components are conventional in nature, as are the means of communicating with the same. By way of non-limiting example, the computer-readable media includes computer storage media and/or communications media. The computer storage media, or machine-readable media, includes media implemented in any method or a technology for storing information. Examples of stored information includes computer-useable instructions, data structures, program modules, and other data representations. The computer storage media includes, but is not limited to, random-access memory (RAM), read-only memory (ROM), electronically erasable programmable read-only memory (EEPROM), flash memory or other memory technology, compact disc read-only memory (CD-ROM), digital versatile discs (DVDs), holographic media or other optical disc storage, magnetic cassettes, magnetic tape, magnetic disc storage, and/or other magnetic storage devices. These memory components may store data momentarily, temporarily, or permanently. The computer storage media does not encompass a transitory signal in embodiments of the present disclosure. The computer storage media does not include a propagated data signal.

The communications media typically stores computer-useable instructions, including data structures and program modules, in form of a modulated data signal. The term "modulated data signal" refers to a propagated signal that has one or more of its characteristics set or changed to encode information associated therewith. The communications media includes any information-delivery media. By way of non-limiting example, the communications media includes wired media, such as a wired network or a direct-wired connection; and wireless media, such as acoustic, infrared, radio, microwave, spread-spectrum, and other wireless media technologies. Combinations of the above are included within the scope of the computer-readable media.

At a high level, systems, methods, and the computer-readable media described herein enables a system and an apparatus for steering an electromagnetic energy beam.

There is a need to transmit electromagnetic energy signals within tight spaces and around corners within buildings. For example, there lies a difficulty to transmit an RF signal to an interior portion of a building. Current solutions are expensive, intrusive, and difficult to install. As such, a solution using a Luneburg lens repeater is able to overcome these obstacles. By tapping into directional properties of the Luneburg lens, the RF signals are re-transmitted to a desired location. Herein are several embodiments of the Luneburg lens repeater which enables a system to re-transmit signals around tight corners and obstacles. These embodiments include passive repeaters, active repeaters, and multipath active repeaters.

According to a first aspect of the present disclosure, an electromagnetic energy beam steering apparatus is provided. The electromagnetic energy beam steering apparatus comprises a Luneburg lens; a first antenna and a second antenna, wherein the first antenna is located at a first focal point of the Luneburg lens, and wherein the second antenna is located at a second focal point of the Luneburg lens; and a transmission line wherein the transmission line receives a collected signal from the first antenna and transmits the collected signal to the second antenna.

According to a second aspect of the present disclosure, an electromagnetic energy beam steering method is provided. The method comprises receiving a first signal at a Luneburg lens. The method further comprises collecting a first collected signal from the Luneburg lens at a first antenna, wherein the first antenna is located at a first focal point of the Luneburg lens. Additionally, the method comprises transmitting the first collected signal through a transmission line system wherein the transmission line system transmits the first collected signal from the first antenna and combines the first collected signal with a self-interference cancellation signal to create a first transmit signal which is then transmitted to a second antenna and then transmitted through the Luneburg lens, wherein the second antenna is located at a second focal point of the Luneburg lens.

According to a third aspect of the present disclosure, a computer-readable media which includes computer-executable instructions embodied thereon that, when executed, perform a method for operating an electromagnetic energy beam steering apparatus. In accordance with the apparatus operated by the method executed by the media comprising a Luneburg lens. The electromagnetic energy beam steering apparatus includes a Luneburg lens; a first receive antenna and a second receive antenna, wherein the first receive antenna is located at a first focal point of the Luneburg lens, and wherein the second receive antenna is located at a second focal point of the Luneburg lens, and wherein the first receive antenna is positioned to receive a first multipath signal and the second receive antenna is positioned to receive a second multipath signal. The electromagnetic energy beam steering apparatus further includes a transmission line system, wherein the transmission line system combines a first collected signal from the first receive antenna with a second collected signal from the second receive antenna to create a first combined signal. The electromagnetic energy beam steering apparatus also includes a first transmit antenna, wherein the first transmit antenna receives the first combined signal and transmits the first combined signal through the Luneburg lens.

Figure 1:
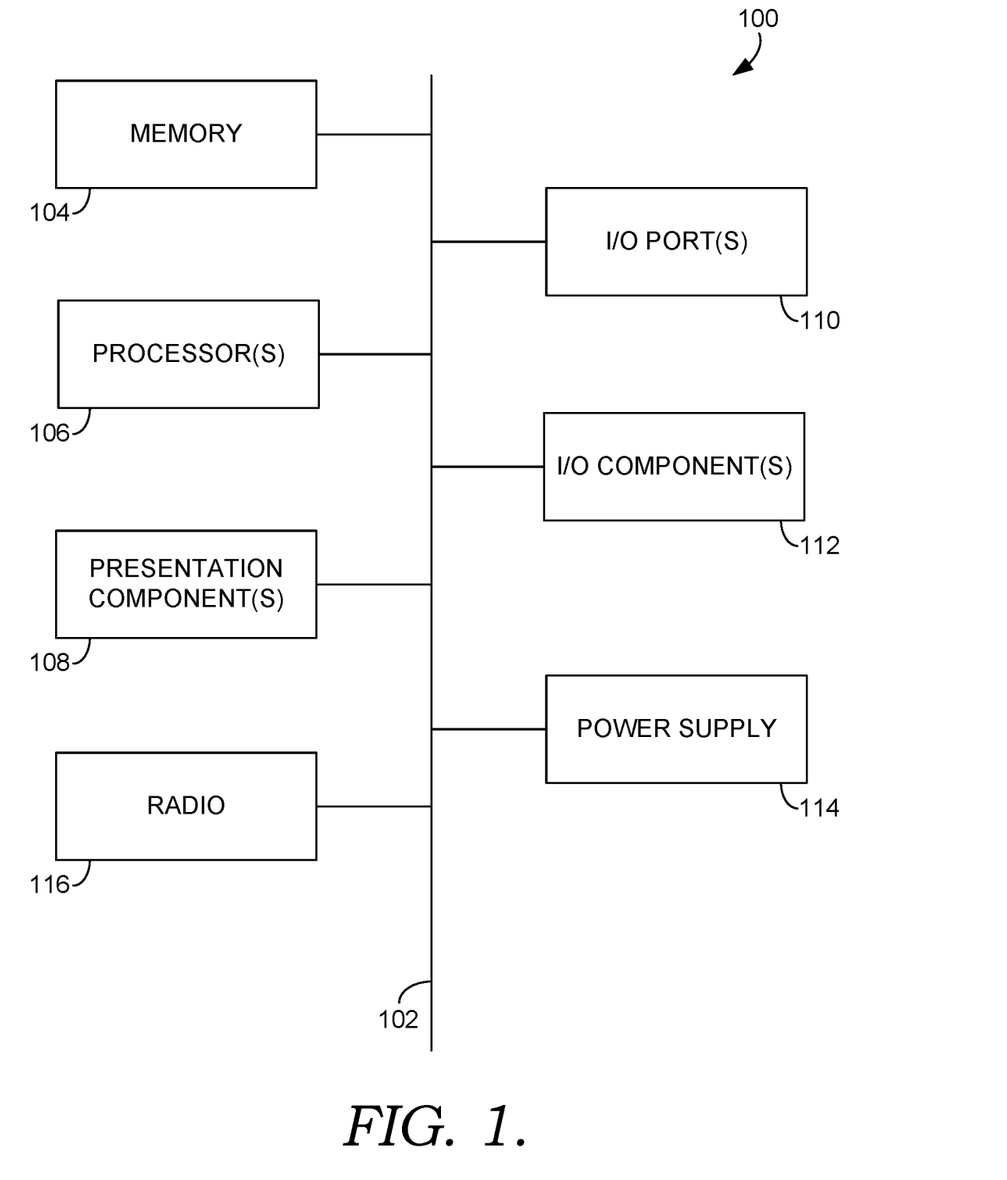
FIG. 1 depicts an exemplary computing device suitable for use in implementations of aspects of the present disclosure.

Referring now to FIG. 1, an exemplary computing environment suitable for use in implementations of the present disclosure, is illustrated. In particular, the exemplary computer environment is shown and designated generally as a computing device 100. The computing device 100 may be an example of a suitable computing environment and is not intended to suggest any limitation to the scope of use or functionality of the present disclosure. Neither should the computing device 100 be interpreted as having any dependency or requirement relating to any one or combination of components illustrated in FIG. 1.

The implementations of the present disclosure may be described in a general context of a computer code or machine-useable instructions, including computer-executable instructions, such as program components, being executed by a computer or other machine, such as a personal data assistant or other handheld device. Generally, the program components, including routines, programs, objects, components, data structures, and the like, refer to a code that performs particular tasks or implements particular abstract data types. Implementations of the present disclosure may be practiced in a variety of system configurations, including handheld devices, consumer electronics, general-purpose computers, specialty computing devices, and the like. Implementations of the present disclosure may also be practiced in distributed computing environments where tasks are performed by remote-processing devices that are linked through a communications network.

With continued reference to FIG. 1, the computing device 100 includes a bus 102 that directly or indirectly couples the following devices: a memory 104, one or more processors 106, one or more presentation component(s) 108, input/output (I/O) port(s) 110, I/O component(s) 112, and a power supply 114. The bus 102 may include one or more busses (such as an address bus, a data bus, or a combination thereof). Although the devices in FIG. 1 are shown with lines for the sake of clarity, in reality, delineating various components is not so clear and, metaphorically, the lines would more accurately be grey and fuzzy. For example, one may consider a presentation component, such as a display device to be one of the I/O component(s) 112. Also, processors, such as the one or more processors 106, includes the memory 104. The present disclosure recognizes that such is the nature of the art and reiterates that FIG. 1 is merely illustrative of the exemplary computing environment that may be used in connection with one or more implementations of the present disclosure. Distinction is not made between such categories as "a workstation," "a server," "a laptop," "a handheld device," etc., as all are contemplated within the scope of FIG. 1 and refer to "a computer" or "a computing device."

The computing device 100 typically includes a variety of computer-readable media. The computer-readable media may be any available media that may be accessed by the computing device 500 and includes both the volatile and nonvolatile media, the removable and non-removable media. By way of a non-limiting example, the computer-readable media may include the computer storage media and the communication media. The computer storage media includes both volatile and nonvolatile, removable, and non-removable media implemented in any method or technology for storage of information, such as computer-readable instructions, data structures, program modules, or other data.

The memory 104 includes the computer-storage media in form of a volatile and/or nonvolatile memory. The memory 104 may be removable, non-removable, or a combination thereof. Examples of the memory 104 include a solid-state memory, hard drives, optical-disc drives, etc. The computing device 100 includes the one or more processors 106 that read data from various entities, such as the bus 102, the memory 104, or the I/O component(s) 112. The one or more presentation component(s) 108 presents data indications to a person or another device. Examples of the presentation components 108 include a display device, a speaker, a printing component, a vibrating component, etc. The I/O port(s) 110 allow the computing device 100 to be logically coupled to other devices including the I/O component(s) 112, some of which may be built in the computing device 100. The I/O component(s) 112 includes a microphone, a joystick, a game pad, a satellite dish, a scanner, a printer, a wireless device, etc.

A radio 116 of the computing device 100 represents a radio that facilitates communication with a wireless telecommunications network. Wireless telecommunications technologies include, but are not limited to, code-division multiple access (CDMA), general packet radio service (GPRS), time-division multiple access (TDMA), global system for mobile communication (GSM), and the like. The radio 116 may additionally or alternatively facilitate other types of wireless communications including wireless fidelity (Wi-Fi), worldwide interoperability for microwave access (WiMAX), long-term evolution (LTE), or other voice over internet protocol (VoIP) communications. As may be appreciated, in various embodiments, the radio 116 may be configured to support multiple technologies and/or multiple radios may be utilized to support multiple technologies. The wireless telecommunications network may include an array of devices, which are not shown so as to not obscure more relevant aspects of the present disclosure. Components, such as a base station, a communications tower, or access points (as well as other components) may provide wireless connectivity in some embodiments.

Figure 2:
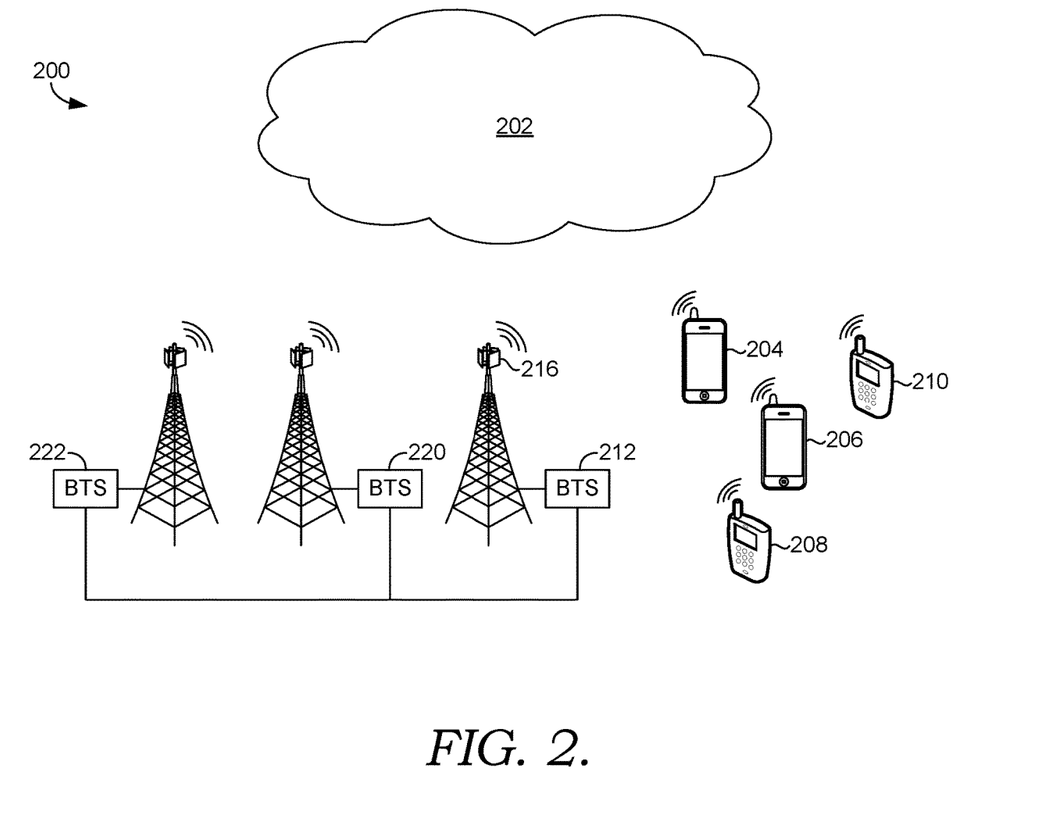
FIG. 2 depicts an exemplary network environment, in accordance with an embodiment of the present disclosure.

Referring to FIG. 2, an exemplary network environment 200 suitable for use in implementing embodiments of the present disclosure is illustrated. The network environment 200 is illustrated as an example of a suitable network environment and is not intended to suggest any limitation to the scope of use or functionality of the present disclosure. Neither should the network environment 200 be interpreted as having any dependency or requirement relating to any one or combination of components illustrated.

The network environment 200 includes a network 202 that provides service to a current User Equipment (UE) 204 and 206, and one or more legacy UE 208 and 210. The network 202 may be accessible through a base transceiver station 212 that is connected to a backhaul server (not shown). The base transceiver station 212 and/or the computing device 100 (for example, a local device or a remote device) associated with the base transceiver station 212 may manage or otherwise control operation of components of a cell site, including an antenna array 216. The base transceiver station 212 and/or the computing device 100 associated with the base transceiver station 212 may include the one or more processors 106 and the computer-readable storage media having computer-executable instructions or computer instruction modules embodied thereon for execution by the one or more processors 106.

The antenna array 216 may radiate in a particular direction and, thus, may correspond to a particular sector of the cell site. In some embodiments, the antenna array 216 may have a plurality of antenna elements. In one embodiment, the antenna array 216 is configured to have a plurality of elements that in number, arrangement, and/or density, are configured for massive Multiple-in Multiple-out (mMIMO) configuration. Such configuration may include the transmission of a signal in a collimated fashion or a generally collimated fashion. In one embodiment, the base transceiver station 212 may include a radio and/or a controller, such as a Massive Multiple-Input Multiple-Output (mMIMO) Unit for controlling a mMIMO configured antenna array, such as the antenna array 216 having the plurality of antenna elements. The base transceiver station 212 may use the controller to monitor one or more of throughput, signal quality metrics (for example, signal-to-interference-plus-noise ratio (SINR)), number of unique users/subscribers, number of unique UE(s), and/or remote location filings that occur at the base transceiver station 212, all of which may be monitored dynamically and/or stored in a data store. The antenna array 216 may also be configured to operate under a lower order number of antenna elements than an antenna array configured to operate under the mMIMO configuration. Such a lower order configuration may be a legacy system, such as an eight branch transmit and eight branch receive (8T8R) antenna structure.

The base transceiver station 212 may use the radio (such as the radio 116) that is connected to the antenna array 216 by a physical radio-frequency (RF) path, where the radio is used to cause the antenna array 216 to transmit radio-frequency signals using the plurality of antenna elements. The plurality of antenna elements in the antenna array 216 may include portions of antenna elements (not shown). In some embodiments, the plurality of antenna elements of the antenna array 216 may be partitioned such that a first portion of antenna elements may be associated with, dedicated to, correspond to, and/or be configured to, operate using a first access technology, and a second portion of antenna elements may be associated with, dedicated to, correspond to, and/or be configured to, operate using a second access technology. In one embodiment, the plurality of antenna elements may be partitioned into unequal groups or, alternatively, "split" into equal halves, wherein each group or half operates to provide a coverage area for a distinct access technology when the antenna array 216 operates in a dual technology mode.

In some embodiments, the antenna array 216 is partitioned such that the first portion of antenna elements is associated with a first access technology and the second portion of antenna elements is associated with a second access technology. In some embodiments, when the antenna array 216 is operating in the dual technology mode, each portion of the plurality of antenna elements may operate using only one distinct protocol and/or an access technology relative to the other portions in the antenna array 216. In one example, the first portion of antenna elements may operate using 5G wireless access technology and the second portion of antenna elements may operate using 4G wireless access technology. Additionally, it will be understood that the terms "first" and "second" are used herein for the purpose of clarity in distinguishing portions of antenna elements from one another, but the terms are not used herein to limit the sequence, relevance, number of portions, technological functions, and/or operations of each portion unless specifically and explicitly stated.

As such, the base transceiver station 212 may provide the current UE 204 and 206 and the legacy UE 208 and 210 with access to the network 202. In some embodiments, the first portion of antenna elements may communicate with the current UE 204 and 206 using the 5G wireless access technology, and the second portion of the antenna elements may communicate with the legacy UE 208 and 210 using the 4G wireless access technology. When operating in the dual technology mode, the antenna array 216 may concurrently connect to and communicate with the current UE 204 and 206 and the legacy UE 208 and 210 using, respectively, at least two distinct access technologies.

Accordingly, in one example, when the antenna array 216 is operating in the dual technology mode, the base transceiver station 212 concurrently acts an eNodeB (or "eNB") and gNodeB (or "gNB"). As such, the base transceiver station 212 may provide service to one or more access technologies to both the current UE 204 and 206 and the legacy UE 208 and 210. In addition to communicating with the current UE 204 and 206 and the legacy UE 208 and 210, the base transceiver station 212 may also communicate with one or more neighboring base transceiver stations. In some embodiments, the base transceiver station 212 may communicate with neighboring base transceiver station 220 using the first access technology and may communicate with another neighboring base transceiver station 222 using the second access technology. For example, since the base transceiver station 212 may operate concurrently as the eNodeB and the gNodeB using the antenna array 216 that is partitioned and operating in the dual technology mode, the base transceiver station 212 may communicate with other base transceiver stations, such as the neighboring base transceiver stations 220 and 222. For example, the base transceiver station 212 communication may include legacy base transceiver stations that cannot use current access technologies (for example, 5G) or current base transceiver stations that lack backward compatibility with prior access technologies (for example, 4G). In some embodiments, the base transceiver station 212 may bi-directionally exchange information with the neighboring base transceiver stations 220 and 222 through an X2 interface or X2 link. Information regarding signal quality, RF conditions, one or more remote line failures (RLFs), and SINR levels at each of the neighboring base transceiver stations 220 and 222, and/or as reported from the current or legacy UE to the neighboring base transceiver stations 220 and 222, may be communicated to the base transceiver station 212 via the X2 link. Additionally, or alternatively, information regarding the signal quality, the RLFs, and the SINR levels at each of the neighboring base transceiver stations 220 and 222 may be communicated to the base transceiver station 212 over a backhaul.

As mentioned, the base transceiver station 212 may include the radio and/or the controller, such as a memory management unit (MMU), that enables the base transceiver station 212 to adjust or modify the operations and transmissions of the plurality of antenna elements in the antenna array 216. In some embodiments, operations, configurations, and/or settings of each antenna element may be individually controlled and adjusted by the base transceiver station 212 using the controller. In some embodiments, the operations, the configurations, and/or the settings of the first portion of antenna elements may be controlled and adjusted as a group by the base transceiver station 212 using the controller, such as the MMU, independent of the second portion of antenna elements. In a similar fashion, the operations, the configurations, and/or the settings of the second portion of antenna elements may be controlled and adjusted as a group by the base transceiver station 212 using the controller, independent of the first portion of antenna elements. Accordingly, the base transceiver station 212 may use the controller to independently adjust different groups or portions of the antenna elements within one antenna array, such as the antenna array 216.

In some embodiments, the operations, the configurations, and/or the settings of each individual antenna element may be adjusted and customized. For example, the base transceiver station 212 instructs a portion of the antenna elements to transmit one or more synchronization signals using a periodicity. In another example, the portion of the antenna elements may transmit a plurality of synchronization signals using the periodicity, as instructed by the base transceiver station 212. In some embodiments, the synchronization signals may be specific to and/or configured for the first access technology.

Accordingly, the base transceiver station 212 may use the controller to independently adjust different individual antenna elements, any number of groupings and/or subset(s) of each portion of the antenna elements, and/or portions of the antenna elements within one antenna array, such as the antenna array 216. In some embodiments, the base transceiver station 212 may use the controller to measure and monitor one or more of throughput, signal quality metrics (for example, SINR), number of unique users/subscribers, number of unique UE, and/or RLFs.

Figure 3A:
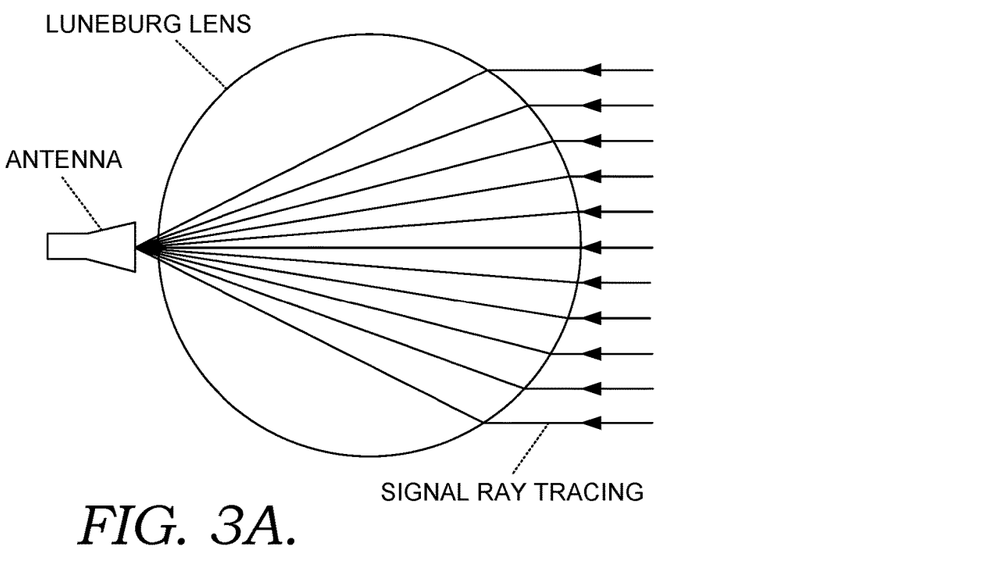
FIG. 3A an exemplary ray tracing schematic of an electromagnetic steering apparatus, in accordance with an aspect of the present disclosure.
Figure 3B:
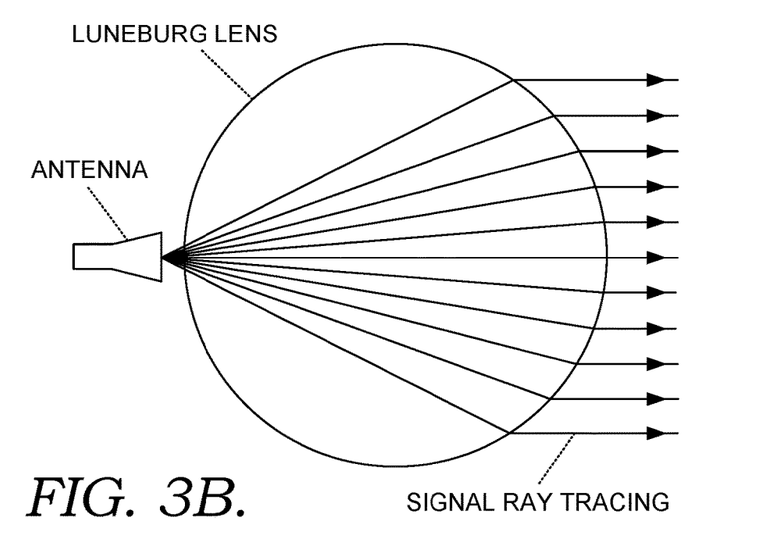
FIG. 3B depicts an exemplary ray tracing schematic of an electromagnetic steering apparatus, in accordance with an aspect of the present disclosure.

Turning now to FIG. 3A, an exemplary ray tracing of a Luneburg lens is illustrated. The Luneburg lens is a round lens with a symmetric variable index of refraction. A shape of the Luneburg lens may be cylindrical, hemispherical, or fully spherical. A design of the Luneburg lens focuses signal energy on a point opposite an angle of incidence. A focal point may be changed based on the design elements. For example, a size, the shape, and material properties may impact a location of the focal point at which an antenna may be placed to receive RF energy. As can be seen in FIG. 3A, an incoming signal may be incident on a surface of the Luneburg lens. The Luneburg lens then focuses that energy or signal on a focal point beyond the Luneburg lens where an antenna or mirror may be placed to collect a focused signal. Turning now to FIG. 3B, an exemplary ray tracing of the Luneburg lens is illustrated. Similar to the ray tracing in FIG. 3A, the Luneburg Lens may be used to collimate a diverging signal from an antenna. For example, the antenna at the focal point of the Luneburg lens may be used to transmit across the Luneburg lens to focus the energy in a narrow beam The Luneburg lens may be used as a passive signal repeater utilizing off-axis parabolic reflectors in the same location as the focal point of the Luneburg lens. For example, a focal point of the off-axis parabolic reflector may be placed in the same location as the focal point of the Luneburg lens, and energy may be directed in a desired direction. For such passive configuration, all incident energy is passed through the Luneburg lens and reflectors. Energy arrives on the off-axis parabolic reflector and is focused onto the focal point of the Luneburg lens and transmitted across the Luneburg lens. At the same time, energy arriving from a top of the Luneburg lens is focused onto the focal point of the off-axis parabolic reflector. This reflector sends the energy at a 90-degree angle relative to the angle of incidence on the Luneburg lens. Additionally, the focal points of the parabolic reflectors or any other signal receiver in other embodiments may be orthogonal or any other angle from the other signal receivers. Response signals follow the same path, but in reverse direction.

Figure 4:
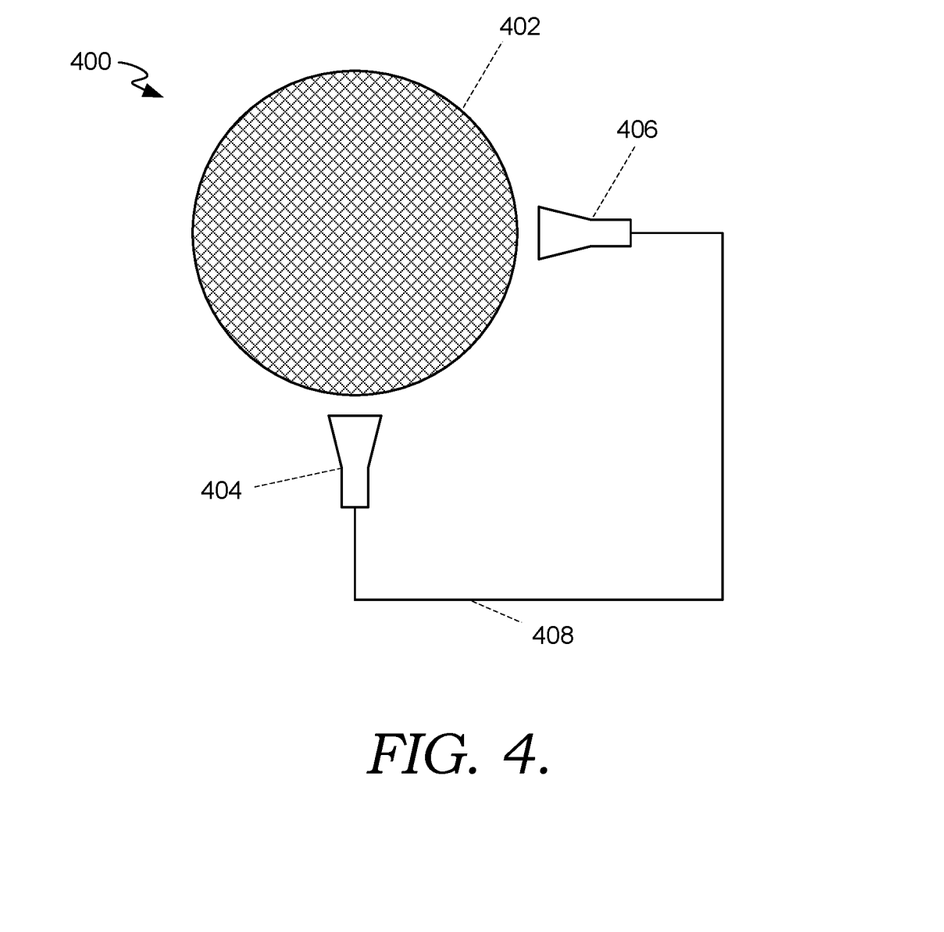
FIG. 4 depicts an exemplary arrangement of an electromagnetic energy steering apparatus, in accordance with an aspect of the present disclosure.

An embodiment of a passive single Luneburg lens repeater 400 is shown in FIG. 4. The passive single Luneburg lens repeater 400 may include a Luneburg lens 402, a first antenna 404, a second antenna 406, and a transmission line 408. In one aspect, a signal is propagated by a base station (such as the base transceiver station 212) as described above and received by the Luneburg lens 402. Additionally, the signal received by the Luneburg lens 402 may come from any sort of transmitter or signal propagation such as an antenna, a transmitter, a transceiver, or any other method of communicating a telecommunications signal or any other signal. The signal is received by the Luneburg lens 402 from a first direction and redirected in a second direction. The signal in the described embodiment may come from a direction opposite the receiving antenna which may be the first antenna 404 or the second antenna 406. For example, a transmitted signal may arrive at the Luneburg lens 402 from the direction opposite the first antenna 404. The signal is then focused onto the first antenna 404 as described in FIG. 3A. The first antenna 404 may be comprised of a feedhorn antenna for use in receiving and transmitting millimeter wave frequencies. In one aspect, the first antenna 404 is comprised of a circular feedhorn antenna coupled to a waveguide. In other aspects, the first antenna 404 may be comprised of an antenna as described above with respect to FIG. 2. In one aspect, the first antenna 404 may be comprised of a parabolic dish antenna. In another aspect, the first antenna 404 may be any suitable antenna for collecting the signal from the Luneburg lens 402. Additionally, the first antenna 404 and any other antenna within this disclosure may be oriented to transmit a signal and receive a signal or oriented to receive only or transmit only.

Once the signal is collected by the first antenna 404, the signal may then be routed or transmitted from the first antenna 404 to the second antenna 406 via the transmission line 408. The transmission line 408 may be a waveguide, a coaxial cable, a bifilar line, or any other suitable method of transmitting the signal from the first antenna 404 to the second antenna 406. A length of transmission line 408 or the waveguide may be an integer multiple of half the wavelength of the signal passing through the Luneburg lens 402. The first antenna 404 and the second antenna 406 may additionally be communicatively coupled to a signal transceiver. Once the second antenna 406 receives the signal from the first antenna 404, the second antenna 406 may transmit the signal through the Luneburg lens 402 similar to the description of a signal propagation described with respect to FIG. 3B. For example, the signal may be transmitted out of the second antenna 406 and be expanded and collimated, similar to the ray tracing described with respect to FIG. 3B.

Similarly, a response signal, or any other signal may be received by the Luneburg lens 402 focused and received on the second antenna 406 passing through the transmission line 408 and transmitted through the first antenna 404 and across the Luneburg lens 402. An orientation of the first antenna 404 and the second antenna 406 may be predetermined to maximize isolation and minimize cross talk or feedback between the two antennas 404, 406. Placement of the two antennas 404, 406 may be in orthogonal planes as shown in FIG. 4. The placement of the two antennas 404, 406 may also be in any other orientation needed to receive the signal and transmit the signal. For example, if a desired signal is received in a first direction and a desired transmission location is located in a second direction, the first antenna 404 may be oriented to receive the signal from the first direction and the second antenna 406 may be oriented to transmit in the second direction.

Figure 5:
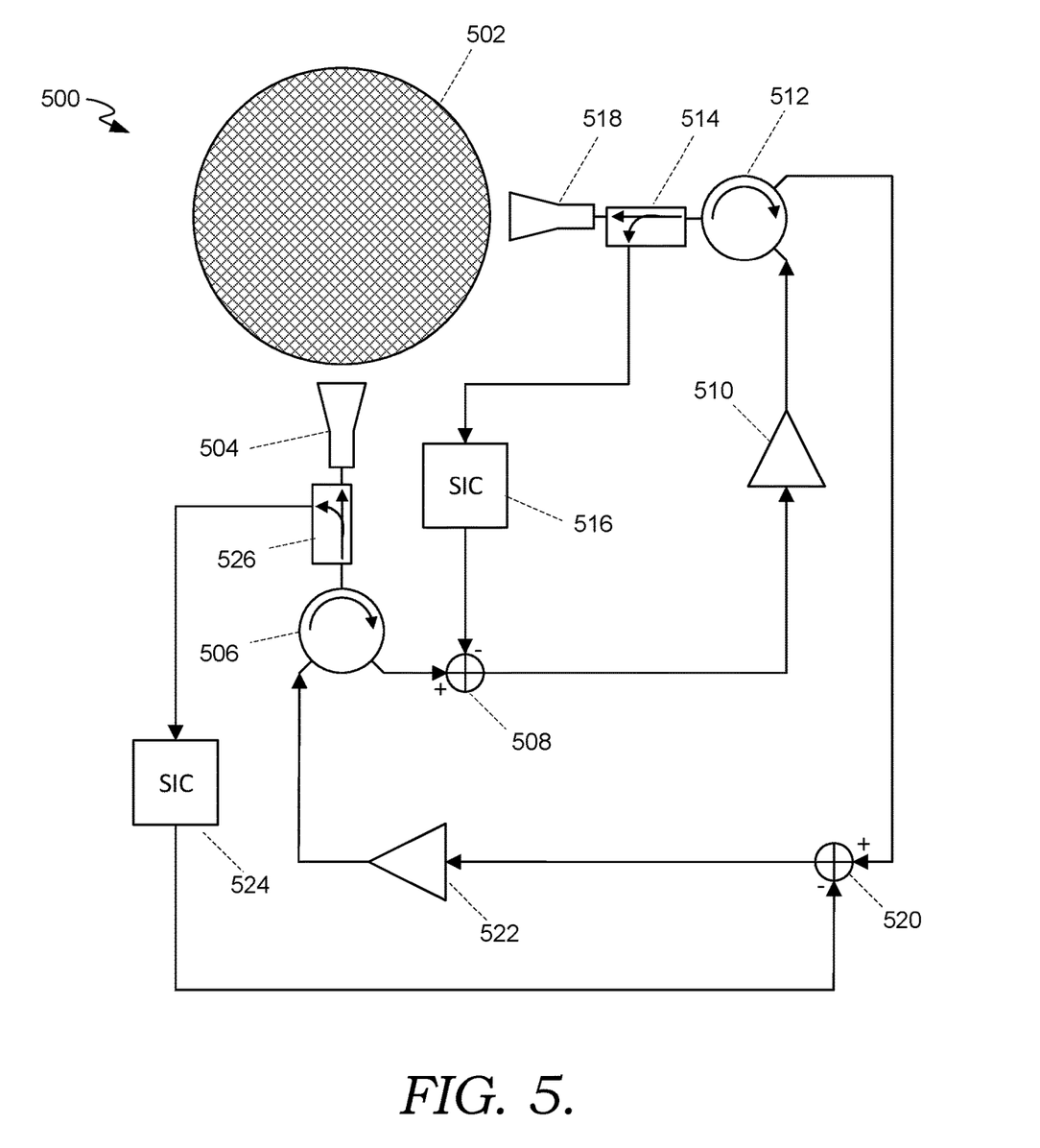
FIG. 5 depicts an exemplary arrangement of an electromagnetic energy steering apparatus, in accordance with an aspect of the present disclosure.

Turning now to FIG. 5, an active single Luneburg lens repeater 500 is depicted according to some aspects of the present disclosure. The active single Luneburg lens repeater 500 proposes a solution that improves isolation between a first antenna 504 and a second antenna 518. In the active single Luneburg lens repeater 500, self-interference cancelation (SIC) circuitry components 524 and 516 are utilized to improve isolation and reduce noise, cross talk, or feedback between the first antenna 504 and the second antenna 518. Additionally, amplifiers 510 and 522 are used in-line to boost the signal prior to retransmission. The active single Luneburg lens repeater 500 may also include a Luneburg lens 502, circulators 506 and 512, combiners 508 and 520, and directional couplers 514 and 526. Other components may be incorporated in the active single Luneburg lens repeater 500 but are not described herein for brevity.

Similar to the operation of the passive single Luneburg lens repeater 400, a signal arriving at the Luneburg lens 502 from a direction opposite the first antenna 504 is focused onto the first antenna 504. The signal passes unimpeded through the directional coupler 526 and is routed through the circulator 506. From the circulator 506, the signal is combined using the combiner 508 with a signal that mitigates self-interference. From there, it goes through the amplifier 510 and is then routed by the second circulator 512 for transmission across the Luneburg lens 502 from the second antenna 518. Prior to transmission through the second antenna 518, a copy of the signal is sent by the directional coupler 514 to the self-interference cancelation circuitry component 516. An output of this circuitry is combined using the combiner 508 with the input signal to cancel self-interference.

Similarly, a signal is received on the second antenna 518, passing unimpeded through the directional coupler 514. The signal is routed through the circulator 512 to the combiner 520 to mix with an interference-mitigating signal and a resultant signal gets amplified by the amplifier 522. It is then routed through the circulator 506 to be transmitted through the first antenna 504. Prior to transmission through the first antenna 504, a copy of the signal is obtained from the directional coupler 526 and routed to the self-interference cancelation circuitry component 524. The output of this circuitry is combined by the combiner 520 with the input signal to cancel self-interference.

The Luneburg lens 502, the first antenna 504, and the second antenna 518 are similar to those elements described previously. For example, the Luneburg lens 502 operates to focus an input signal onto a focal point. The first antenna 504 is located at the focal point to collect the focused signal. The collected focused signal is then passed from the first antenna 504 to the second antenna 518 through the other components of the active single Luneburg lens repeater 500. The first antenna 504 and the second antenna 518 may be any antenna which may operate to collect, receive and/or transmit a signal focused by the Luneburg lens 502.

The signal initially passes from the first antenna 504 or the second antenna 518 into the directional coupler 526 or 514. The directional coupler 526 or 514 may not operate on the signal at this stage but may operate on the signal by splitting the signal or creating a copy of the signal to be fed into the self-interference cancellation circuitry component 516 and 524. For example, when the signal passes from the circulator 506 or 512 to the first antenna 504 or second antenna 518, the directional coupler creates a copy of the signal and sends the rest of the signal to the antennas 504, 518.

The circulator 506 and 512 is a passive, non-reciprocal three port device that allows a signal to exit a port directly after the one it entered. For example, the circulator 506 has three ports, such as a port to the directional coupler 526, a port to the combiner 508, and a port to the amplifier 522. As shown in FIG. 5, the signal entering the circulator 506 will exit towards the combiner 508. A signal from the amplifier 522 will exit towards the directional coupler 526. As the signal pass through the circulator 506 or 512 for the first time, the signal goes to the combiner 508 where a raw signal is combined with a signal produced by the self-interference cancelation circuitry component 516 and 524. The signal produced by the self-interference cancelation circuitry component 516 and 524 is a signal produced to destructively interfere with the raw signal to reduce self-interference. The signal then passes through the amplifier 510 or 522 which amplifies the signal. The amplifier 510 and 522 may be any active or passive amplifier that may be used to increase the signal strength. The amplified signal then passes through the circulator 512 and 506 to the directional coupler 514 and 526 and a copy of the signal is generated or the signal is split such that a portion goes towards the self-interference cancelation circuitry component 516 and 524 and a portion goes towards the first antenna 504 or the second antenna 518 where the signal is transmitted through the Luneburg lens 502.

Figure 6:
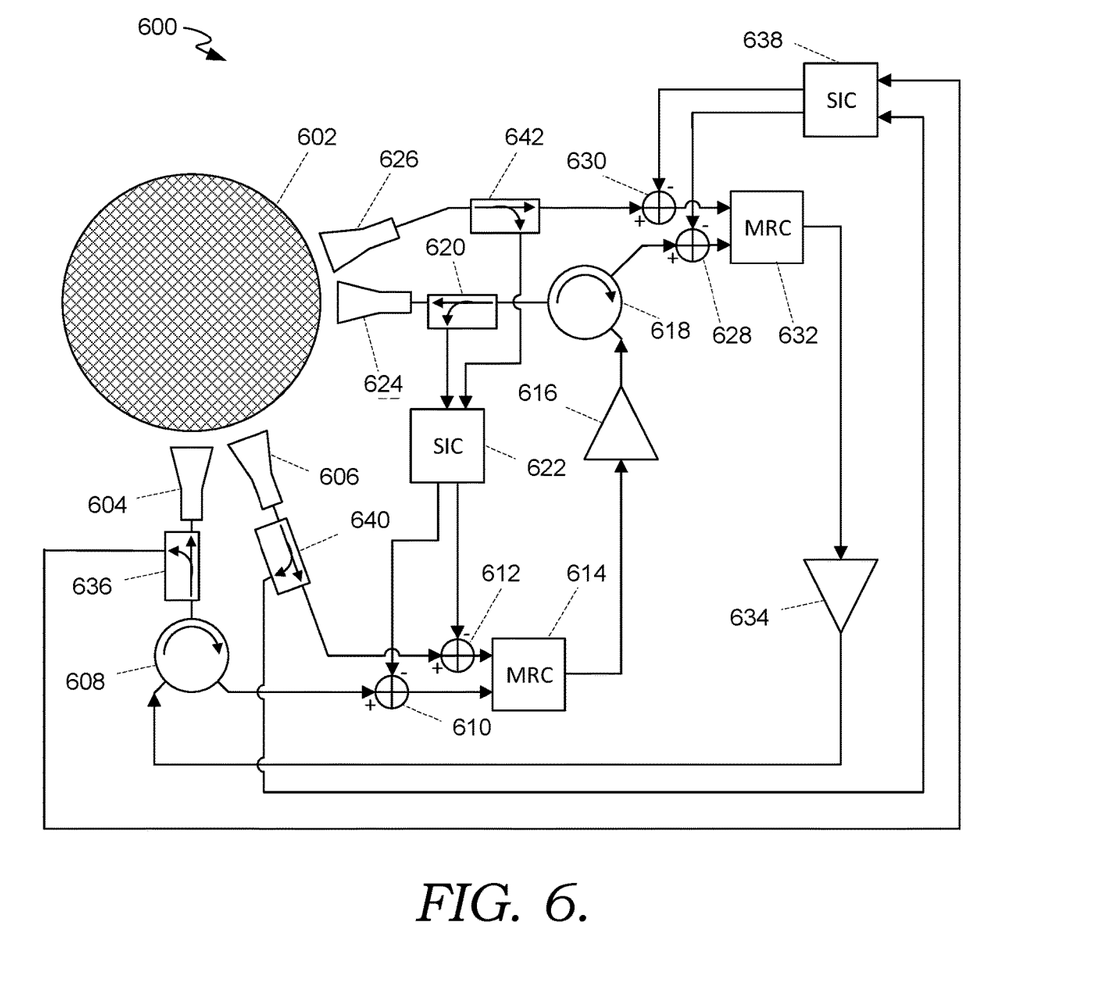
FIG. 6 depicts an exemplary arrangement of an electromagnetic energy steering apparatus, in accordance with an aspect of the present disclosure.

Turning now to FIG. 6, a multipath configuration 600 where reflected versions of the desired signal will arrive from different directions and with varying delay, is illustrated. Given the different angles of arrival for multipath signals, multiple receive antennas may be placed along a Luneburg lens 602 to capture these signals. Active circuitry, such as Maximal-Ratio Combining (MRC) 614 and 632, are added to constructively combine these signals and retransmit a resulting signal from a different focal point of the Luneburg lens 602, such as an antenna 624 and an antenna 604. Any suitable mechanism for combining multipath signals would be appropriate for this system.

In FIG. 6 the Luneburg lens 602 may be configured to combine a main receive signal and a multipath signal, and then retransmit a resultant combined signal across the Luneburg lens 602 in a different direction. This figure only shows one secondary capture antenna 606 and 626 for capturing a multipath signal from a particular direction, but additional receive antennas may be placed about the Luneburg lens 602 to capture multipath signals. While there are multiple receive antennas (such as antennas 606 and 626), there is only one transmit antenna 604 and 624 for each path.

In the multipath configuration 600, a signal is received from a direction opposite a first antenna 604 and passes unimpeded through a directional coupler 636 to a circulator 608. At the same time, a copy of the signal slightly offset in time (multipath signal) is received on the secondary capture antenna 606. Each of these signals is combined with an interference mitigating signal at combiners 610 and 612. The two versions of the signals are combined constructively at the MRC 614. The signals are combined using a variety of mechanisms which are not described herein. The resultant combined signal is amplified using an amplifier 616. The amplified signal is routed to a circulator 618 for transmission across the Luneburg lens 602. Prior to transmission through the second antenna 624, a copy of the signal is sent by a directional coupler 620 to a self-interference cancelation (SIC) circuitry 622. The SIC circuitry 622 also receives a copy of the signal from the secondary capture antenna 626. An output of this circuitry is combined using the combiner 612 and 610 with respective input signals to cancel self-interference.

Similarly, a signal is focused on the second antenna 624, and a multipath signal is focused on the secondary capture antenna 626. Each of these signals is combined using combiners 630 and 628 with an interference mitigating signal. A resultant signal is fed to an amplifier 634. The resultant signal is then routed through a circulator 608 to the first antenna 604. The directional coupler 636 sends a copy of the signal being transmitted to a SIC circuitry 638. The SIC circuitry 638 also receives a copy of the signal by the secondary capture receive antenna 626 via a directional coupler 642. This SIC circuitry 638 provides corrective signals to the input signals via combiners 630 and 628.

The elements which are similar and described in both FIG. 5 and FIG. 6 operate with similar functions and will not be described here. The directional coupler 636 and 640 do not operate on a signal traveling opposite the direction of the arrows. However, when a signal is traveling the same direction as the arrows in the schematic, the signal is split and a copy of the signal goes to a respective antenna or the SIC circuitry 638. The MRC 614 and 632 combines the two multipath signals in a manner that accounts for the time delay between the signals received at the first antenna 604 and the secondary capture antenna 606.

Figure 7:
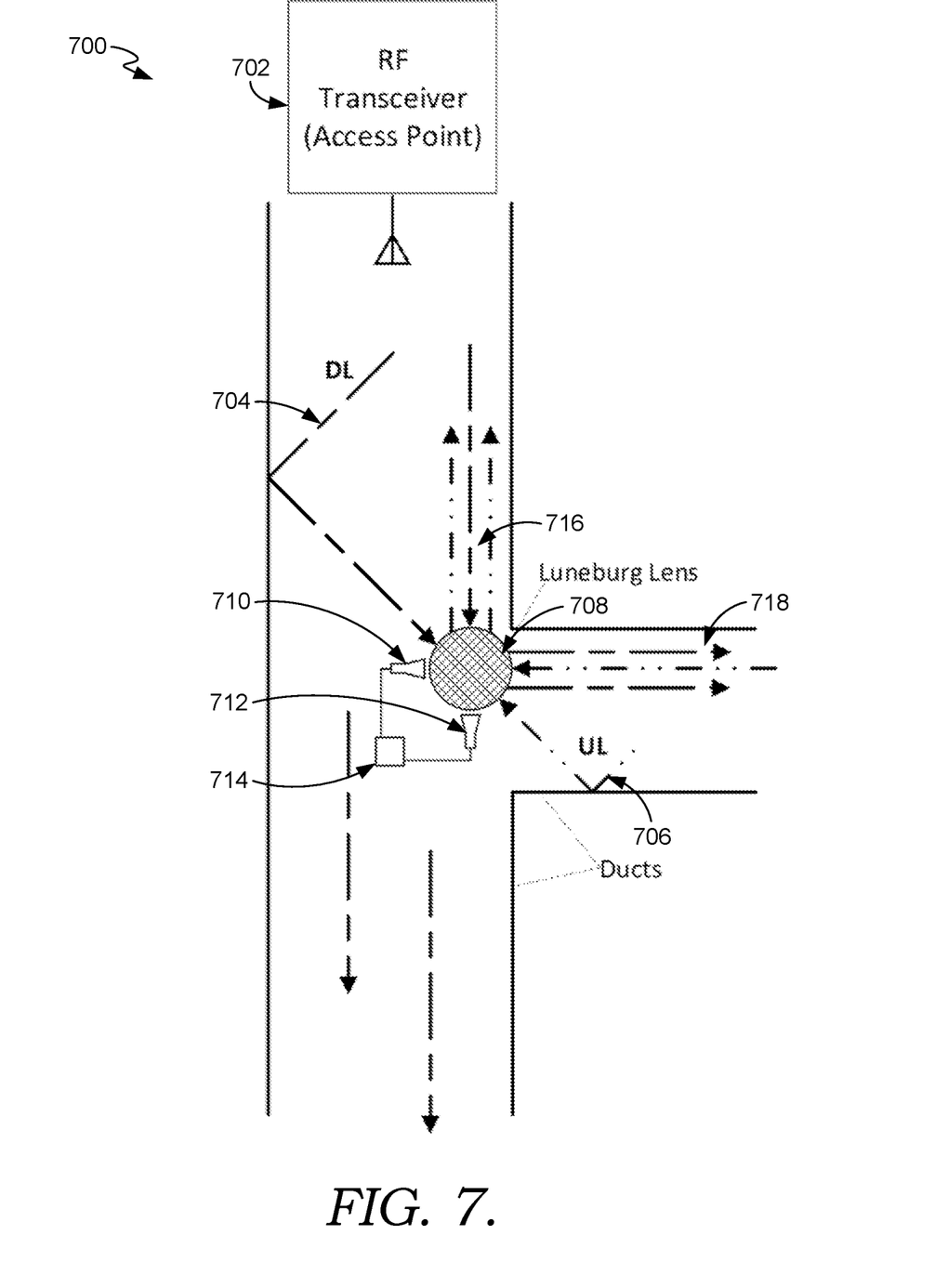
FIG. 7 depicts an exemplary arrangement of an electromagnetic energy steering apparatus, in accordance with an aspect of the present disclosure.

Turning now to FIG. 7, an exemplary embodiment of a Luneburg lens being used to re-radiate Time Division Duplex (TDD) signals at angles in air ducts, is illustrated. A cross-sectional dimension of the duct are much greater than a wavelength of a propagating signal. An exemplary embodiment environment 700 may include an RF transceiver 702, a downlink signal 704, an uplink signal 706, a Luneburg lens repeater 708, a first antenna 710, a second antenna 712, a Luneburg lens circuitry 714, a directional input signal 716, and a directional output signal 718.

The RF transceiver 702 may be any mechanism for transmitting signals. For example, the RF transceiver 702 may be an access point or a base station as described above in FIG. 2. Additionally, the RF transceiver 702 may be a low-powered cellular radio access node. In another aspect, the RF transceiver 702 may be a small-cell access point. The RF transceiver 702 may be implemented to direct a signal from an access point in an air duct. The RF transceiver 702 may transmit the downlink signal 704 and receive the uplink signal 706. However, the air duct may have an optimal size for air flow but not for RF energy propagation. The Luneburg lens repeater 708 may be used to actively inject the air duct with a desired RF signal, and relay signals on a return path to the RF transceiver 702. The Luneburg lens repeater 708 provides an isolation between the downlink (DL) signal 704 and the uplink (UL) signal 706 incident on the Luneburg lens repeater 708 and minimizes feedback oscillation and maximizes line-of-sight down in each of the air duct.

As an example, the RF transceiver 702 may transmit an RF signal in a TDD system. The DL signal 704 may propagate down the air duct and be intercepted by the Luneburg lens repeater 708. The Luneburg lens repeater 708 may be any one of the Luneburg lens described previously in this disclosure. As an example, a multipath active Luneburg lens repeater as described with respect to FIG. 6 (such as the Luneburg lens 602) may intercept the DL signal 704 at multiple incident angles. This is because the multipath system employs multiple receiver antennas (such as the second antenna 712) at various positions. The position of the second antenna 712 may be optimized to capture a majority of the DL signal 704. The Luneburg lens repeater 708 may then transmit the DL signal 704 as the directional output signal 718 in a collimated fashion, thus maximizing a line of sight of the air duct. This geometry may also be used to transmit a unidirectional signal, such as a broadcast signal. In another example, the Luneburg lens repeater 708 may capture the UL signal 706 by way of a multipath Luneburg lens repeater (such as the Luneburg lens repeater 708). The Luneburg lens repeater 708 may then transmit the UL signal 706 as a collimated beam.

Many different arrangements of the various components depicted, as well as components not shown, are possible without departing from the scope of the claims below.

Embodiments of the present disclosure have been described with an intent to be illustrative rather than be restrictive. Alternative embodiments will become apparent to readers of the present disclosure. Alternative means of implementing the aforementioned aspects may be completed without departing from the scope of the claims below. Certain features and sub-combinations of aspects of the present disclosure are of utility and may be employed without reference to other features and sub-combinations and are contemplated within the scope of the claims.

What is claimed is:

1. An electromagnetic energy beam steering apparatus comprising:
    a Luneburg lens;
    a first receive antenna and a second receive antenna, wherein the first receive antenna is located at a first focal point of the Luneburg lens, and wherein the second receive antenna is located at a second focal point of the Luneburg lens, and wherein the first receive antenna is positioned to receive a first multipath signal and the second receive antenna is positioned to receive a second multipath signal; and
    a transmission line, wherein the transmission line combines a first collected signal from the first receive antenna with a second collected signal from the second receive antenna to create a first combined signal; and
    a first transmit antenna, wherein the first transmit antenna receives the first combined signal and transmits the first combined signal through the Luneburg lens.

2. The electromagnetic energy beam steering apparatus of claim 1, wherein the first focal point and the second focal point are adjacent to each other.

3. The electromagnetic energy beam steering apparatus of claim 1, wherein a location of the first focal point is optimized to receive a first signal.

4. The electromagnetic energy beam steering apparatus of claim 3, wherein the first signal is transmitted from an RF transceiver.

5. The electromagnetic energy beam steering apparatus of claim 4, wherein the RF transceiver is a base station comprising a radio and a Massive Multiple-Input Multiple-Output unit.

6. The electromagnetic energy beam steering apparatus of claim 3, wherein a location of the second focal point is optimized to transmit the first signal to a desired location.

7. An electromagnetic energy beam steering method comprising:
    receiving a first signal at a Luneburg lens, wherein the first signal comprises a communication signal transmitted using either a 4G or a 5G wireless access technology;
    collecting a first collected signal from the Luneburg lens at a first antenna, wherein the first antenna is located at a first focal point of the Luneburg lens; and
    transmitting the first collected signal through a transmission line system, wherein the transmission line system transmits the first collected signal from the first antenna and combines the first collected signal with a signal used to mitigate self-interference cancellation to create a first transmit signal which is then transmitted to a second antenna and transmitted through the Luneburg lens, wherein the second antenna is located at a second focal point of the Luneburg lens.

8. The electromagnetic energy beam steering method of claim 7, wherein the first focal point and the second focal point are orthogonal to each other.

9. The electromagnetic energy beam steering method of claim 7, wherein a location of the first focal point is optimized to receive the first signal.

10. The electromagnetic energy beam steering method of claim 9, wherein the first signal is transmitted from an RF transceiver.

11. The electromagnetic energy beam steering method of claim 10, wherein the RF transceiver is a small cell RF transceiver.

12. The electromagnetic energy beam steering method of claim 9, wherein a location of the second focal point is optimized to transmit the first signal to a desired location.

13. The electromagnetic energy beam steering method of claim 7, wherein the signal used to mitigate self-interference cancellation is generated using a copy of the first collected signal.

* * * * *